United States Patent
Schantz et al.

(10) Patent No.: US 9,507,241 B1
(45) Date of Patent: Nov. 29, 2016

(54) ADJUSTABLE CAMERA FIELD OF VIEW

(71) Applicant: LENOVO (Singapore) PTE, LTD., New Tech Park (SG)

(72) Inventors: Daniel Jordan Schantz, Raleigh, NC (US); Brooks Waldner Flynn, Raleigh, NC (US); Thomas Perelli, Raleigh, NC (US)

(73) Assignee: Lenovo (Singapore) PTE, LTD., New Tech Park (SG)

( * ) Notice: Subject to any disclaimer, the term of this patent is extended or adjusted under 35 U.S.C. 154(b) by 0 days.

(21) Appl. No.: 14/943,525

(22) Filed: Nov. 17, 2015

(51) Int. Cl.
| | | |
|---|---|---|
| *G03B 11/04* | (2006.01) | |
| *G03B 29/00* | (2006.01) | |
| *H04N 5/225* | (2006.01) | |
| *G03B 17/56* | (2006.01) | |

(52) U.S. Cl.
CPC ........... *G03B 11/043* (2013.01); *G03B 17/561* (2013.01); *G03B 29/00* (2013.01); *H04N 5/2257* (2013.01)

(58) Field of Classification Search
CPC .. G03B 17/17; G03B 11/043; G03B 17/561; G03B 29/00; H04N 5/2257
See application file for complete search history.

(56) References Cited

U.S. PATENT DOCUMENTS

| | | | |
|---|---|---|---|
| 6,762,794 B1 | 7/2004 | Ogino | |
| 6,924,948 B2 * | 8/2005 | Oshima | H04N 5/2254 348/335 |
| 6,992,699 B1 * | 1/2006 | Vance | H04N 7/142 348/207.99 |
| 7,432,977 B2 * | 10/2008 | Chiang | G02B 26/0816 348/344 |
| 8,368,808 B2 * | 2/2013 | Zhang | H04N 1/00307 348/373 |
| 2004/0125447 A1 | 7/2004 | Sato et al. | |
| 2008/0079805 A1 | 4/2008 | Takagi et al. | |
| 2009/0122179 A1 * | 5/2009 | Nomura | H04N 5/2257 348/340 |
| 2011/0033170 A1 | 2/2011 | Ikeda et al. | |
| 2011/0249888 A1 | 10/2011 | Caceres et al. | |
| 2012/0236123 A1 | 9/2012 | Chen | |
| 2012/0327196 A1 | 12/2012 | Ohba et al. | |
| 2013/0113901 A1 | 5/2013 | Mori | |
| 2013/0300737 A1 | 11/2013 | Nishino et al. | |
| 2015/0172632 A1 | 6/2015 | Flores et al. | |
| 2015/0220150 A1 | 8/2015 | Plagemann et al. | |

OTHER PUBLICATIONS

U.S. Appl. No. 14/104,848, Office Action Summary, Nov. 23, 2015.
U.S. Appl. No. 14/104,848, Notice of Allowance and Fee(s) Due, Jul. 15, 2016.

* cited by examiner

*Primary Examiner* — W B Perkey
(74) *Attorney, Agent, or Firm* — Kunzler Law Group (57) ABSTRACT

For an adjustable camera field of view, a camera is disposed in an electronic device. A motivator modifies an optical path of the camera through one of a plurality of fields of view.

9 Claims, 11 Drawing Sheets

ADJUSTABLE CAMERA FIELD OF VIEW

BACKGROUND

Field

The subject matter disclosed herein relates to a camera field of view and more particularly relates to an adjustable camera field of view.

Description of the Related Art

A camera may be mounted in the bezel of an electronic device to capture images through a field of view.

BRIEF SUMMARY

An apparatus for an adjustable camera field of view is disclosed. A camera is disposed in an electronic device. A motivator modifies an optical path of the camera through one of a plurality of fields of view. A method and system also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, specific details are provided, such as examples of mechanical interactions, programming, user selections, network transactions, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations of apparatuses, systems, and methods according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1A:
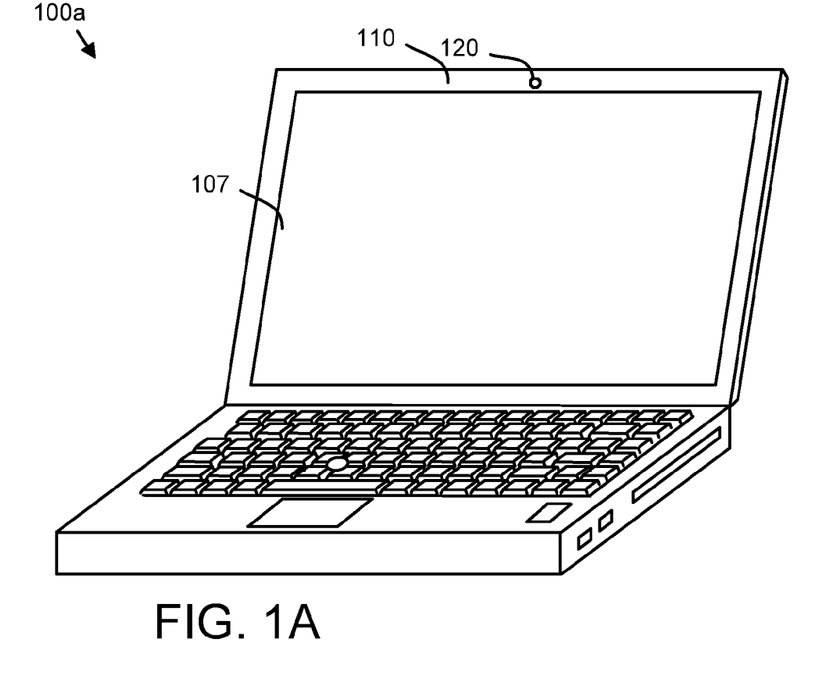
FIG. 1A is a perspective drawing illustrating one embodiment of an electronic device.

FIG. 1A is a perspective drawing illustrating one embodiment of an electronic device 100a. In the depicted embodiment, the electronic device 100a is a laptop computer. The electronic device 100a may include a bezel 110 with a camera apparatus 120 disposed within the bezel 110 and a display 107.

The camera 115 records images from a first field of view. However, in the past, recording images from a second field of view required an additional camera apparatus 120, increasing the cost of the electronic device 100a. The embodiments described herein provide a motivator that modifies an optical path of the camera apparatus 120 through one of a plurality of fields of view. As a result, a single camera apparatus 120 may record images through the plurality of fields of view.

Figure 1B:
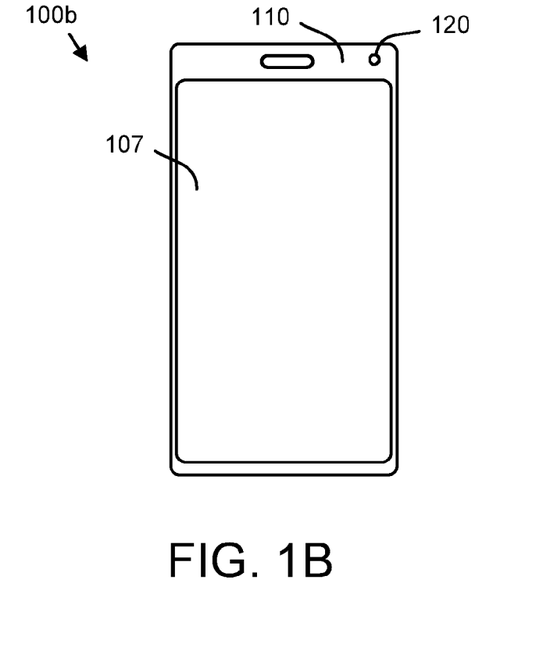
FIG. 1B is a front view drawing illustrating one alternate embodiment of an electronic device.

FIG. 1B is a front view drawing illustrating one alternate embodiment of an electronic device 100b. In the depicted embodiment, the electronic device 100b is a mobile telephone with a bezel 110 and the camera apparatus 120, as well as a display 107.

Figure 2A:
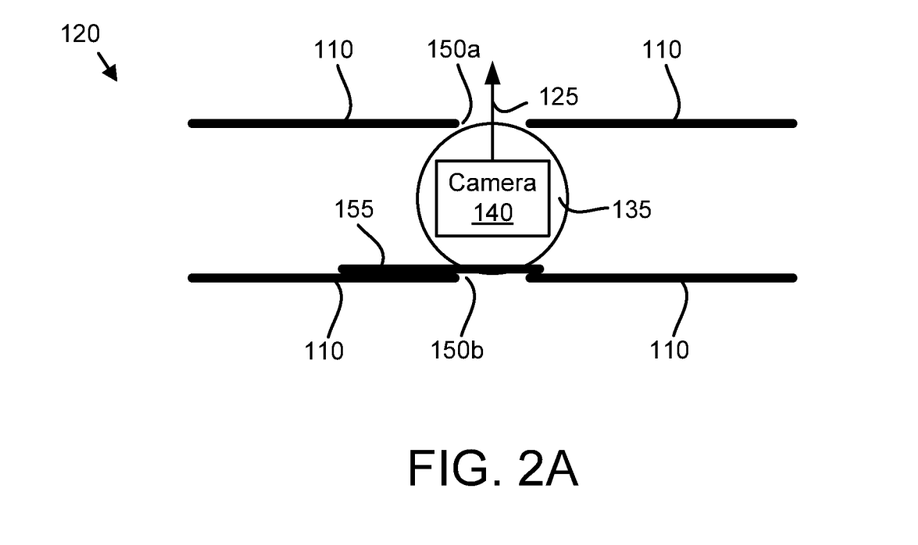
FIG. 2A is a top view drawing illustrating one embodiment of an adjustable camera apparatus with an optical path through a first field of view.

FIG. 2A is a top view drawing illustrating one embodiment of an adjustable camera apparatus 120 with an optical path 125 through a first field of view. The camera apparatus 120 is disposed within the bezel 110 and may include a camera 140, a shutter 155, a pivot 135, and one or more apertures 150.

The camera 140 is in physical communication with the pivot 135. The pivot 135 may position the camera 140 so that the optical path 125 of the camera 140 is through one of a plurality of fields of view. In the depicted embodiment, the pivot 135 positions the camera 140 with an optical path 125 through a field of view of a first aperture 150a. The pivot 135 may rotate the camera 140 about rotation axis that is parallel to a face of the bezel 110. In one embodiment, the rotation axis is a vertical axis. Alternatively, the rotation axis may be a horizontal axis. A motivator may motivate the pivot 135 to position the camera 140.

In the depicted embodiment, the shutter 155 covers a second aperture 150b. The shutter 155 may be embodied in the motivator. Moving the shutter 155 and/or motivator may motivate the pivot 135 and position the optical path 125 of the camera 140. In one embodiment, the shutter 155 is closed if the optical path 125 is through the first field of view of the first aperture 150a and open if the optical path 125 is through the second field of view of the second aperture 150b.

The shutter 155 may be in physical communication with the pivot 135 such that moving the pivot 135 also moves the shutter 155 and/or moving the shutter 155 moves the pivot 135. One embodiment of the physical communication between the pivot 135 and the shutter 155 is shown in FIGS. 2C-D.

Figure 2B:
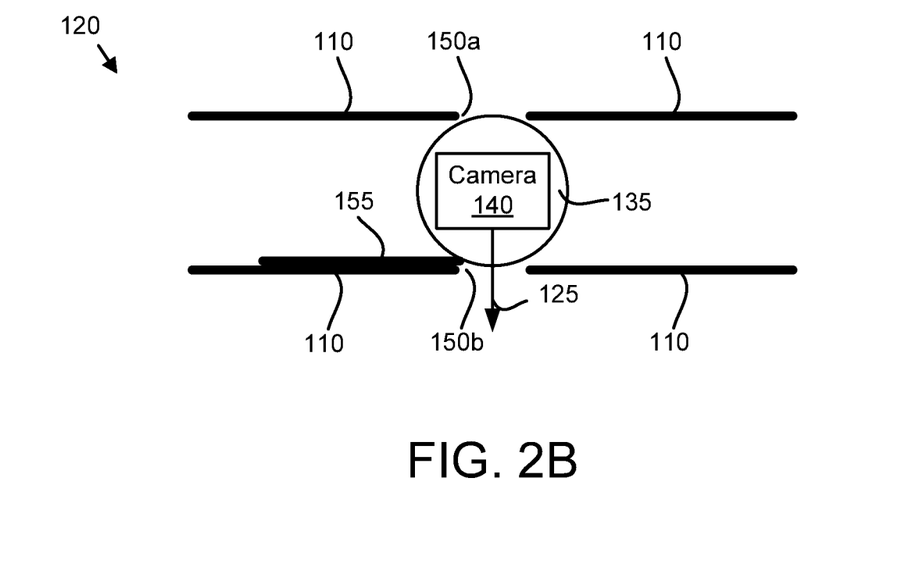
FIG. 2B is a top view drawing illustrating one embodiment of an adjustable camera apparatus with an optical path through a second field of view.

FIG. 2B is a top view drawing illustrating one embodiment of the adjustable camera apparatus 120 of FIG. 2A with the optical path 125 through the second field of view of the second aperture 150b. For example, the shutter 155 may be motivated from the closed position of FIG. 2A to the open position in the depicted embodiment. The movement of the shutter 155 may motivate the pivot 135 to position the camera 140 so that the optical path 125 is through the field of view of the second aperture 150b.

Each aperture 150 may include a transparent cover. Alternatively, each aperture 150 may be a hole through the bezel 110.

Figure 2C:
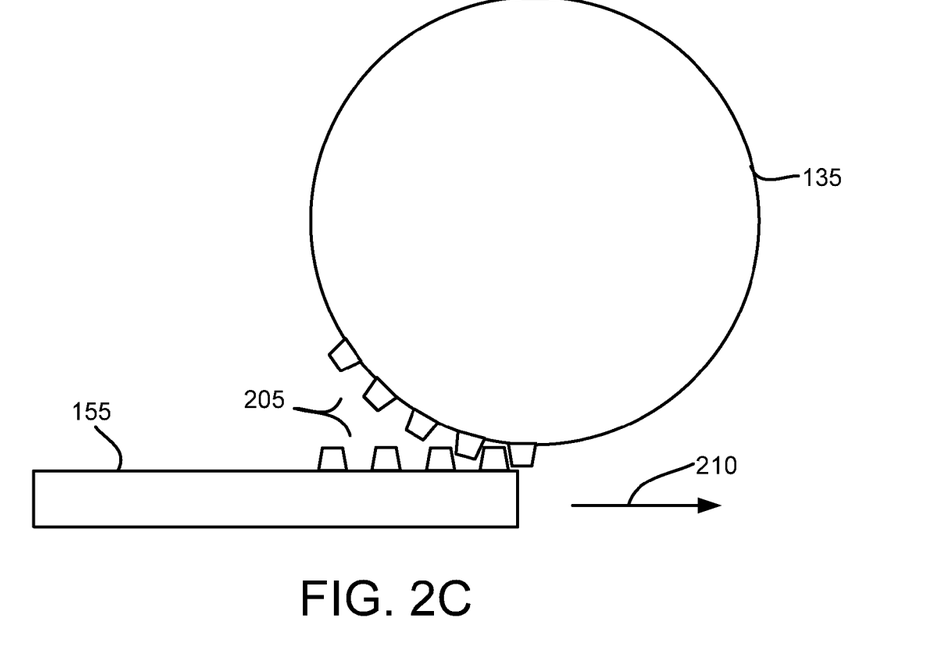
FIG. 2C is a top view drawing illustrating one embodiment of motivator gears in a first position.
Figure 2D:
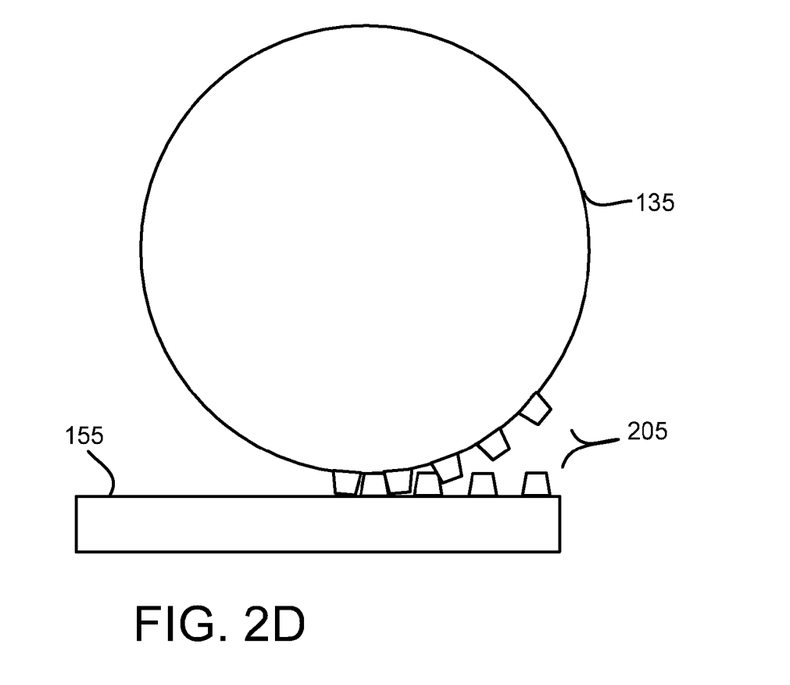
FIG. 2D is a top view drawing illustrating one embodiment of motivator gears in a second position.

FIG. 2C is a top view drawing illustrating one embodiment of motivator gears 205 in a first position. The motivator shutter 155 is depicted with motivator gears 205. Corresponding gears 205 are disposed on the pivot 135. The motivator gears 205 may be meshed so that a movement 210 of the motivator shutter 155 rotates the pivot 135.

FIG. 2D is a top view drawing illustrating one embodiment of the motivator gears 205 in a second position. In the depicted embodiment, the motivator shutter 155 of FIG. 2C has been moved, causing the meshed gears 205 to rotate the pivot 135.

Figure 2E:
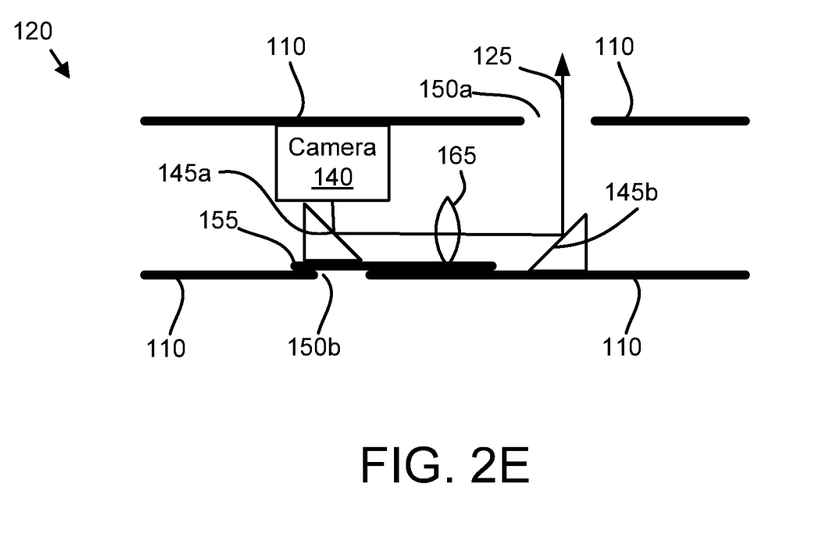
FIG. 2E is a top view drawing illustrating one alternate embodiment of an adjustable camera apparatus with an optical path through a first field of view.

FIG. 2E is a top view drawing illustrating one alternate embodiment of an adjustable camera apparatus 120 with an optical path 125 through a first field of view. In the depicted embodiment, the camera 140 is mounted with an initial optical path 125 that is perpendicular to the face of the bezel 110. In one embodiment, the camera 140 is mounted to the bezel 110.

The optical path 125 is reflected by a first mirror 145a and a second mirror 145b through the field of view of the first aperture 150a. In one embodiment, the optical path 125 may include a focus lens 165. In one embodiment, the first mirror 145a is in physical communication with the shutter 155. As a result, when the shutter 155 is in a closed position as shown in the depicted embodiment, the first mirror 145a modifies the optical path 125 to include the second mirror 145b and the first aperture 150a.

Figure 2F:
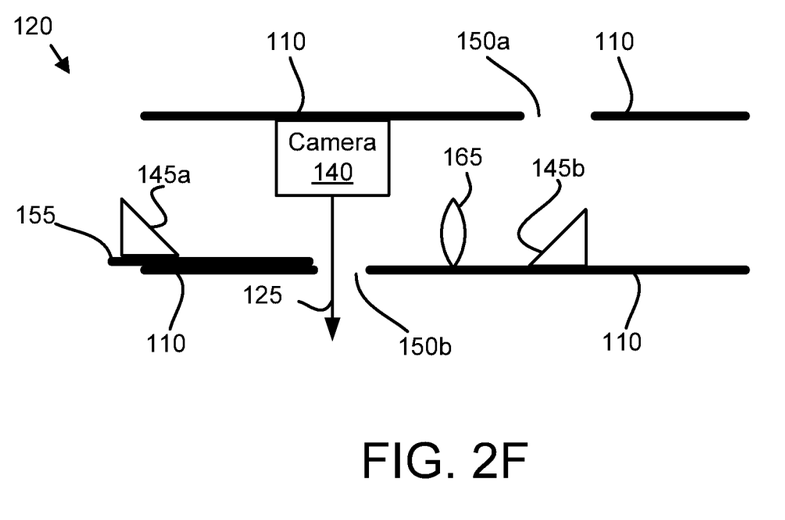
FIG. 2F is a top view drawing illustrating one alternate embodiment of an adjustable camera apparatus with an optical path through a second field of view.

FIG. 2F is a top view drawing illustrating one alternate embodiment of the adjustable camera apparatus 120 of FIG. 2E with the optical path 125 through the second field of view of the second aperture 150b. In the depicted embodiment, the shutter 155 is embodied in the motivator and is moved so that the first mirror 145a does not intersect the optical path 125. Instead, the optical path 125 passes through the field of view of the second aperture 150b.

Figure 2G:
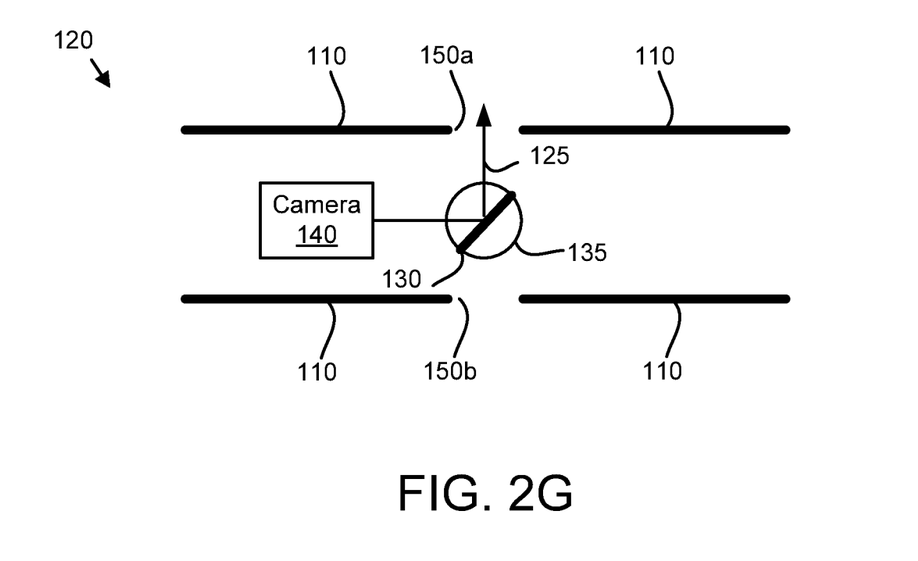
FIG. 2G is a top view drawing illustrating one alternate embodiment of an adjustable camera apparatus with an optical path through a first field of view.

FIG. 2G is a top view drawing illustrating one alternate embodiment of an adjustable camera apparatus 120 with the optical path 125 of the camera 140 through a first field of view of the first aperture 150a. In the depicted embodiment, a pivot mirror 130 is in physical communication with the pivot 135. The pivot mirror 130 intersects the optical path 125 and modifies the optical path 125 through one or more fields of view. In one embodiment, the motivator motivates the pivot 135 to position the optical path 125 through two or more specified fields of view.

Figure 2H:
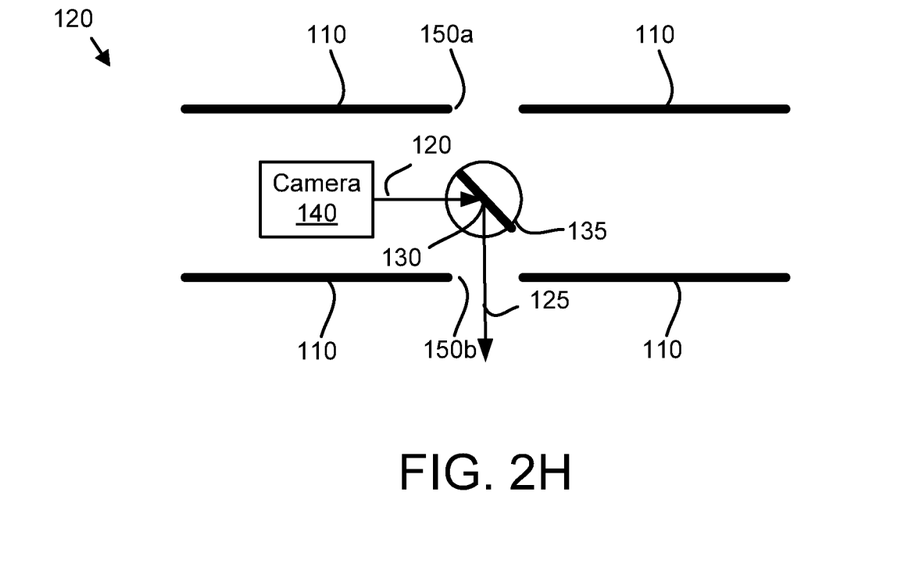
FIG. 2H is a top view drawing illustrating one alternate embodiment of an adjustable camera apparatus with an optical path through a second field of view.

FIG. 2H is a top view drawing illustrating one alternate embodiment of the adjustable camera apparatus 120 of FIG. 2G with the optical path 125 through the second field of view of the second aperture 150b. In one embodiment, the motivator motivates the pivot 135 to rotate the pivot mirror 130 so that instead of modifying the optical path 125 through the first aperture 150a, the pivot mirror 130 directs the optical path 125 through the field of view of the second aperture 150b.

The embodiments modify the optical path 125 through two or more different fields of view. As a result, a single camera 140 may be used to capture multiple fields of view.

Figure 3A:
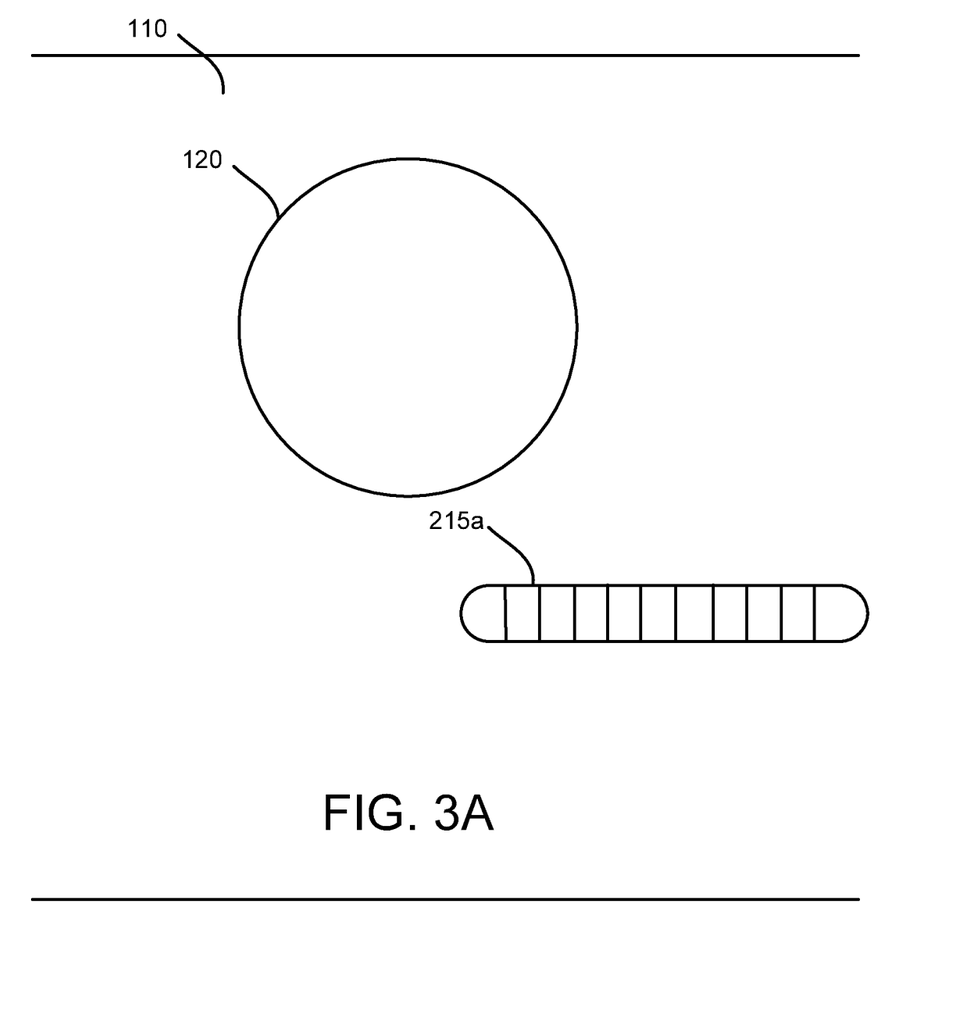
FIG. 3A is a front view drawing illustrating one embodiment of a motivator thumbwheel.

FIG. 3A is a front view drawing illustrating one embodiment of a motivator thumbwheel 215a. The motivator thumbwheel 215a is depicted embedded within the bezel 110, with a portion of the motivator thumbwheel 215a exposed so that the motivator thumbwheel 215a may be moved. The motivator thumbwheel 215a may motivate the pivot 135, the shutter 155, or combinations thereof to modify the optical path 125 of the camera 140. In addition, the motivator thumbwheel 215a may motivate the shutter 155 between the open position and the closed position. In one embodiment, motivating the shutter 155 also motivates the pivot 135.

Figure 3B:
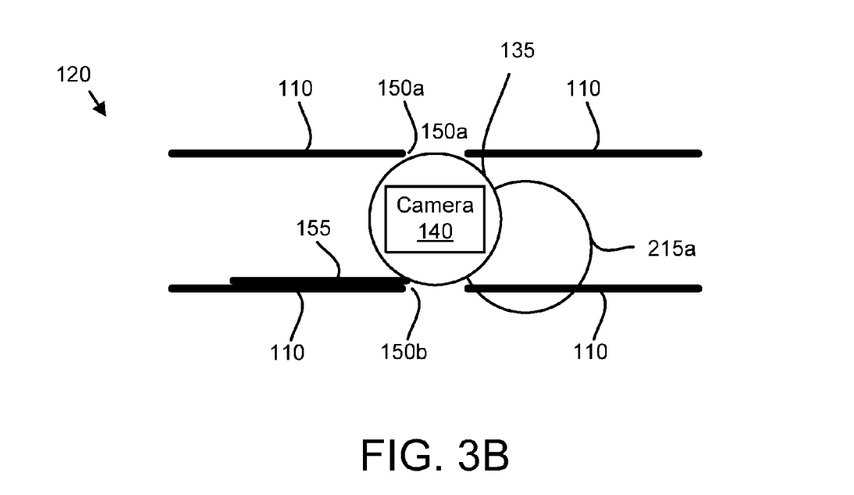
FIG. 3B is a top view drawing illustrating one embodiment of an adjustable camera apparatus.

FIG. 3B is a top view drawing illustrating one embodiment of an adjustable camera apparatus 120. The camera apparatus 120 of FIG. 2B is shown with the motivator thumbwheel 215a. The motivator thumbwheel 215a may be in physical communication with the pivot 135 so that motivating the motivator thumbwheel 215a rotates the pivot 135.

Figure 3C:
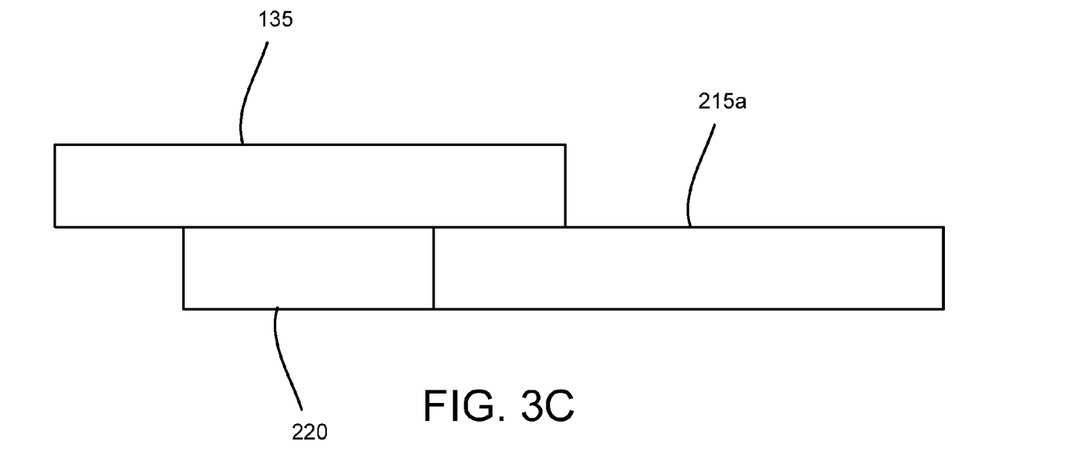
FIG. 3C is a side view drawing illustrating one embodiment of a motivator.

FIG. 3C is a side view drawing illustrating one embodiment of the motivator thumbwheel 215a of FIG. 3B. In the depicted embodiment, the motivator thumbwheel 215a engages a transfer gear 220. The transfer gear 220 may be in physical communication with the pivot 135 so that rotating the transfer gear 220 rotates the pivot 135. Motivating the motivator thumbwheel 215a may rotate the transfer gear 220 and rotate the pivot 135.

Figure 3D:
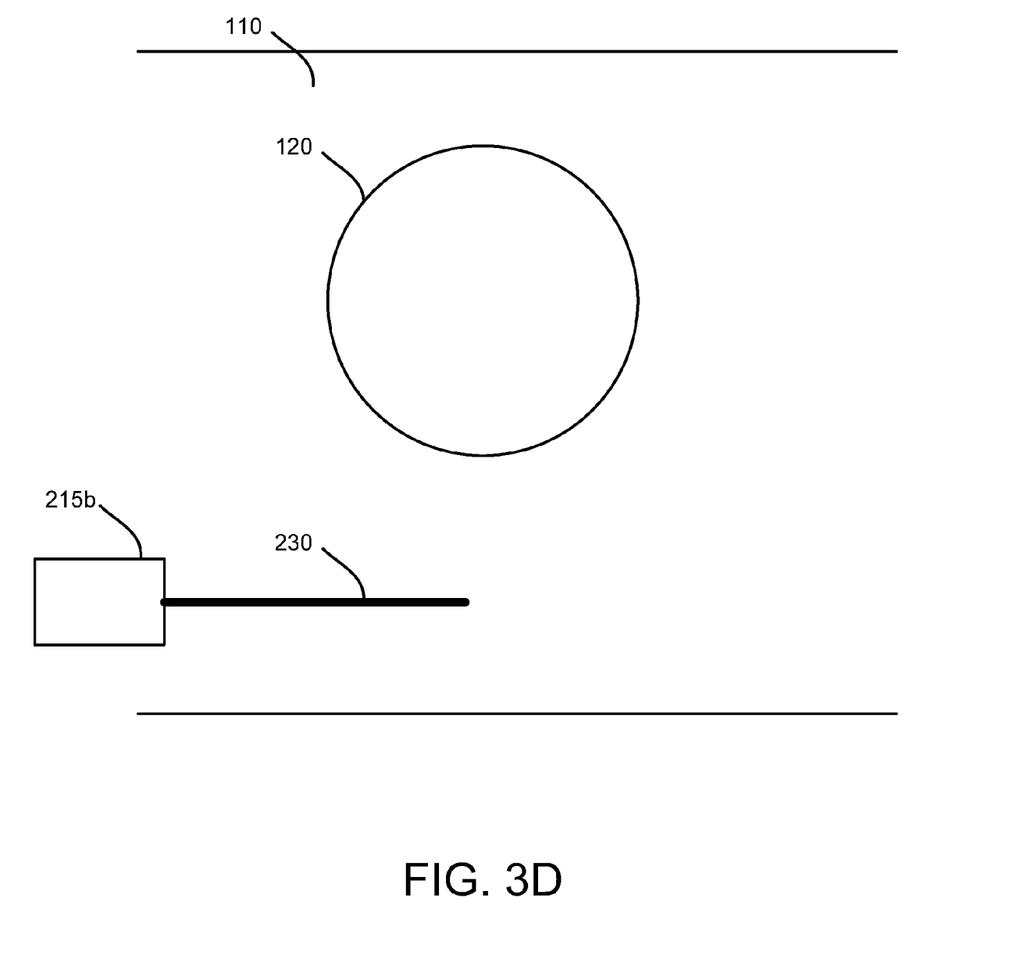
FIG. 3D is a front view drawing illustrating one embodiment of a motivator slide.

FIG. 3D is a front view drawing illustrating one embodiment of a motivator slide 215b and a slide groove 230. In the depicted embodiment, the motivator slide 215b protrudes from the bezel 110. The motivator slide 215b may be moved within the slide groove 230 to modify the optical path 125. In addition, the motivator slide 215b may be motivated to move the shutter 155 between the open position and the closed position.

Figure 3E:
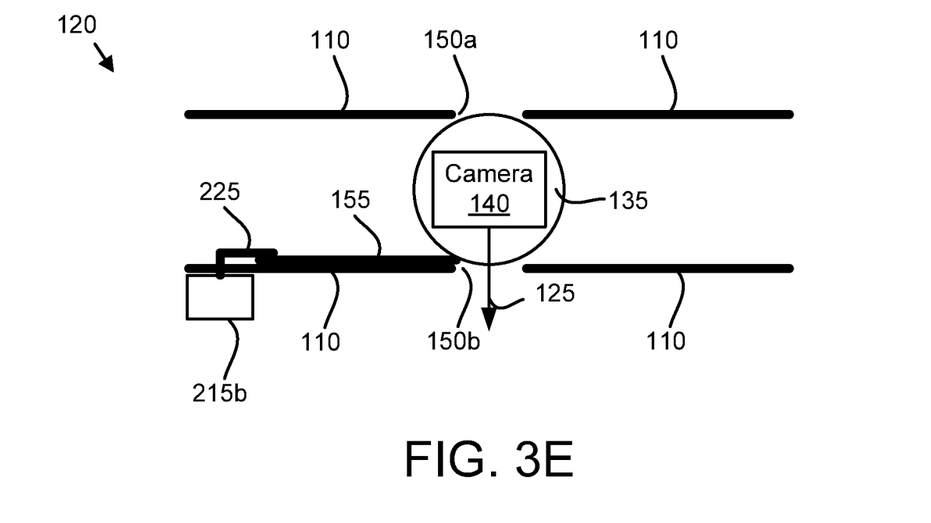
FIG. 3E is a top view drawing illustrating one alternate embodiment of an adjustable camera apparatus.

FIG. 3E is a top view drawing illustrating one embodiment of an adjustable camera apparatus 120. The camera apparatus 120 of FIG. 2B is shown with a motivator slide 215b. The motivator slide 215b may be in physical communication with the shutter 155 through a linkage 225. As a result, motivating the motivator slide 215b may move the shutter 155 and the pivot 135.

Figure 4:
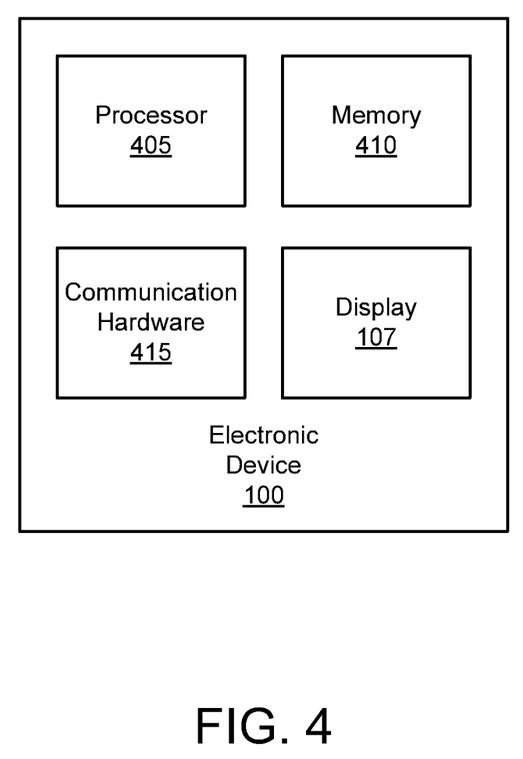
FIG. 4 is a schematic block diagram illustrating one embodiment of an electronic device.

FIG. 4 is a schematic block diagram illustrating one embodiment of the electronic device 100. The electronic device 100 includes a processor 405, a memory 410, communication hardware 415, and the display 107. The memory 410 may be semiconductor storage device, a hard disk drive, an optical storage device, a micromechanical storage device, or combinations thereof. The memory 410 may be a computer readable storage medium. The memory 410 may store code. The processor 405 may execute the code. The communication hardware 415 may communicate with other devices. The display 107 may display data.

Figure 5:
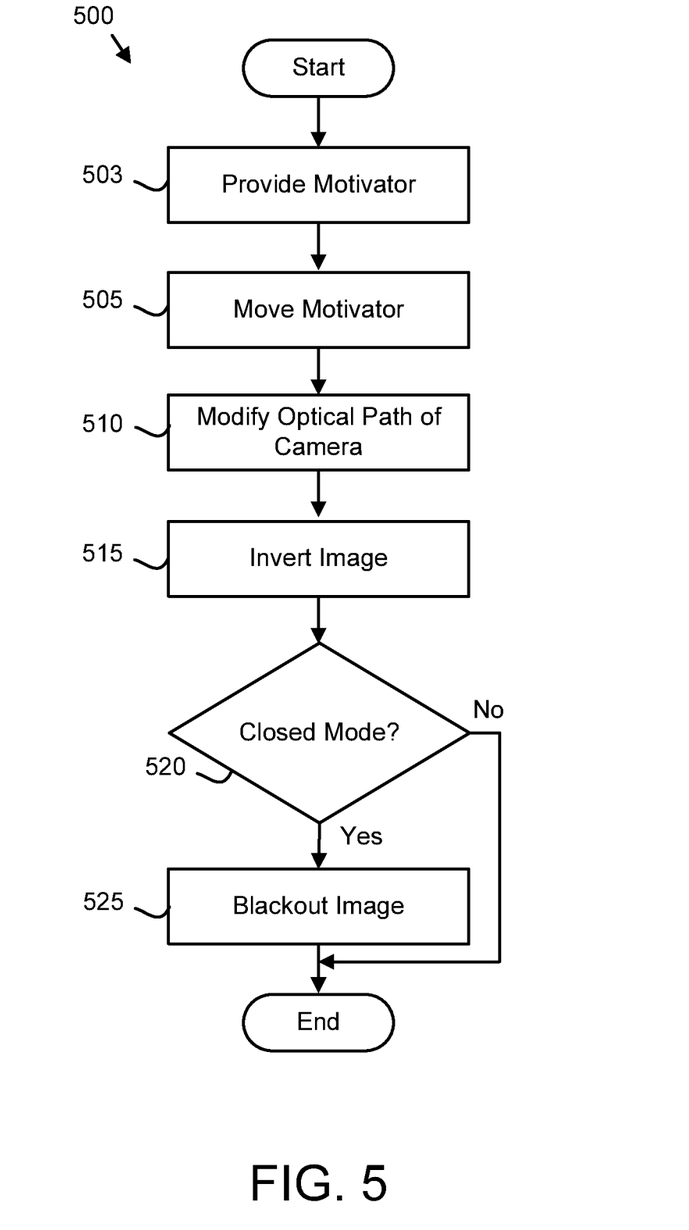
FIG. 5 is a schematic flow chart diagram illustrating one embodiment of an optical path modification method.

FIG. 5 is a schematic flow chart diagram illustrating one embodiment of an optical path modification method 500. The method 500 may be performed by the camera apparatus 120.

The method 500 starts, and in one embodiment, the motivator 215 is provided 503. In addition, the motivator 215 may be moved 505. The motivator 215 may be moved 505 by manual force. Alternatively, the motivator 215 may be moved 505 by an actuator such as a rotational motor, linear motor, piezoelectric actuator, or the like.

The motivator 215 may modify 510 the optical path 125 of the camera 140. In one embodiment, the motivator 215 modifies 510 the optical path 125 by rotating the camera 140 with the pivot 135. Alternatively, the motivator 215 may modify 510 the optical path 125 by rotating the pivot mirror 130 with the pivot 135. In a certain embodiment, the motivator 215 modifies 510 the optical path 125 by moving the mirror 145 to intersect the optical path 125.

In one embodiment, the camera 140 inverts 515 an image that is captured from the optical path 125. The image may be optically inverted 515. Alternatively, the image may be electronically inverted 515. Inverting 515 the image may correct for one or more mirrors in the optical path 125.

A processor 405 may determine 520 if the field of view is in a closed mode. The processor 405 may be embedded in the camera 140. Alternatively, the processor 405 may be embedded in the electronic device 100. For example, if the optical path 125 is not through the field of view, the field of view may be in a closed mode. In addition, the field of view may be in a closed mode if the shutter 155 for the field of view is in a closed position. If the field of view is not in a closed mode, the method 500 ends.

If the processor 405 determines 520 that the field of view is in the closed mode, the processor may blackout 525 the image for the field of view and the method 500 ends. For example, the processor 405 may set all image values for the field of view to black, even if the camera 140 detects light leakage around the shutter 155.

The embodiments modify the optical path 125 of the camera 140 through one or more fields of view. As a result, a single camera 140 may capture images through the each of the fields of view, providing multiple fields of view at a reduced cost.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a pivot disposed in an electronic device;
   a camera disposed in the electronic device and that rotates about the pivot between a first field of view through a first aperture and a second field of view through a second aperture; and
   a shutter that covers the second aperture in a closed position and exposes the second aperture in an open position, the shutter comprising motivator gears that mesh with corresponding gears on the pivot, wherein moving the shutter to the closed position motivates the pivot to rotate the camera to the first field of view and moving the shutter to the open position motivates the pivot to rotate the camera to the second field of view.

2. The apparatus of claim 1, wherein the shutter is moved by a thumbwheel.

3. The apparatus of claim 1, wherein the shutter is moved by one of an actuator and a manual force.

4. A method comprising:
   providing a pivot disposed in an electronic device;
   providing a camera disposed in the electronic device that rotates about the pivot between a first field of view through a first aperture and a second field of view through a second aperture;
   covering the second the second aperture in a closed position with a shutter; and
   exposing the second aperture in an open position with a shutter, the shutter comprising motivator gears that mesh with corresponding gears on the pivot, wherein moving the shutter to the closed position motivates the pivot to rotate the camera to the first field of view and moving the shutter to the open position motivates the pivot to rotate the camera to the second field of view.

5. A system comprising:
   an electronic device comprising a processor and a display;
   a pivot disposed in the electronic device;

a camera disposed in the electronic device that rotates about the pivot between a first field of view through a first aperture and a second field of view through a second aperture; and shutter that covers the second aperture in a closed position and exposes the second aperture in an open position, the shutter comprising motivator gears that mesh with corresponding gears on the pivot, wherein moving the shutter to the closed position motivates the pivot to rotate the camera to the first field of view and moving the shutter to the open position motivates the pivot to rotate the camera to the second field of view;

wherein the processor of the electronic device receives image data from the camera and outputs the image data to the display, wherein the image data corresponds to the one of a plurality of fields of view.

6. The method of claim 4, wherein the shutter is moved by a thumbwheel.

7. The method of claim 4, wherein the shutter is moved by one of an actuator and a manual force.

8. The system of claim 5, wherein the shutter is moved by a thumbwheel.

9. The system of claim 5, wherein the shutter is moved by one of an actuator and a manual force.

* * * * *